United States Patent [19]

Grandjean et al.

[11] 4,383,255

[45] May 10, 1983

[54] MINIATURE DISPLAY DEVICE

[75] Inventors: Pierre-André Grandjean, Neuchatel; Martyn-Andrew Cadman, Hauterive; Raymond Vuilleumier, Fontainemelon; Raymond Guye, Colombier, all of Switzerland

[73] Assignee: Centre Electronique Horloger S.A., Neuchatel, Switzerland

[21] Appl. No.: 242,298

[22] Filed: Mar. 10, 1981

[30] Foreign Application Priority Data

Mar. 11, 1980 [CH] Switzerland ........................ 1890/80

[51] Int. Cl.³ .............................................. G08B 5/36
[52] U.S. Cl. ................................ 340/764; 340/815.27
[58] Field of Search ............. 340/764, 373, 763, 378.2

[56] References Cited

U.S. PATENT DOCUMENTS

| | | | |
|---|---|---|---|
| 3,161,726 | 12/1964 | Todt | 340/764 X |
| 3,444,551 | 5/1969 | Winrow | 340/373 X |
| 3,924,226 | 12/1975 | Lacy et al. | 340/764 |
| 4,234,245 | 11/1980 | Toda et al. | 340/763 X |

Primary Examiner—David L. Trafton
Attorney, Agent, or Firm—Parkhurst & Oliff

[57] ABSTRACT

Each segment of a display device, e.g., a seven-segment display comprises at least one shutter normally obturating a cavity in a carrier on a base plate. Each shutter is suspended by two resilient attachments and can turn about a torsion axis established by these attachments under the influence of an electric field applied between a common electrode on a transparent cover plate and an electrode, individual to the shutter at the bottom of its cavity. An optical contrast is provided by light reflection or absorbance caused by a shutter remaining in a rest obturating position or rotating to an open position to allow light absorption in an absorbing layer backing the base plate which is transparent. A selective light transmission (light valve) construction is equally possible. The shutters themselves may be used as one electrode of each pair, with the torsion axis along a shutter edge. The shutters may be immersed in a liquid dielectric so that a smaller opening angle is required and the attachments can be shaped to provide the required degree of resilience.

26 Claims, 19 Drawing Figures

FIG.3.a
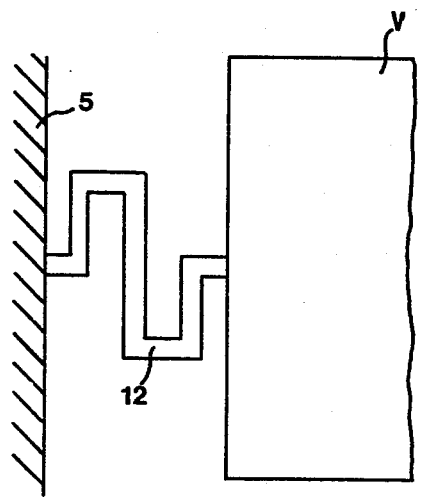
FIG.3.b
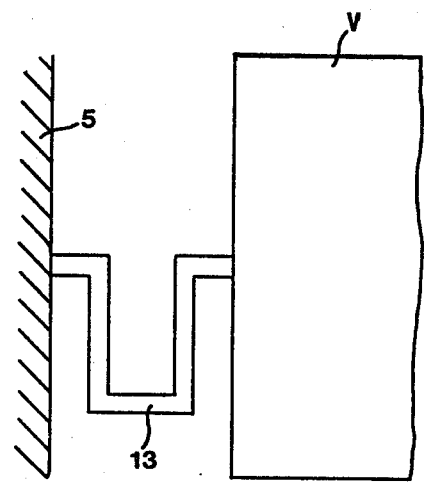
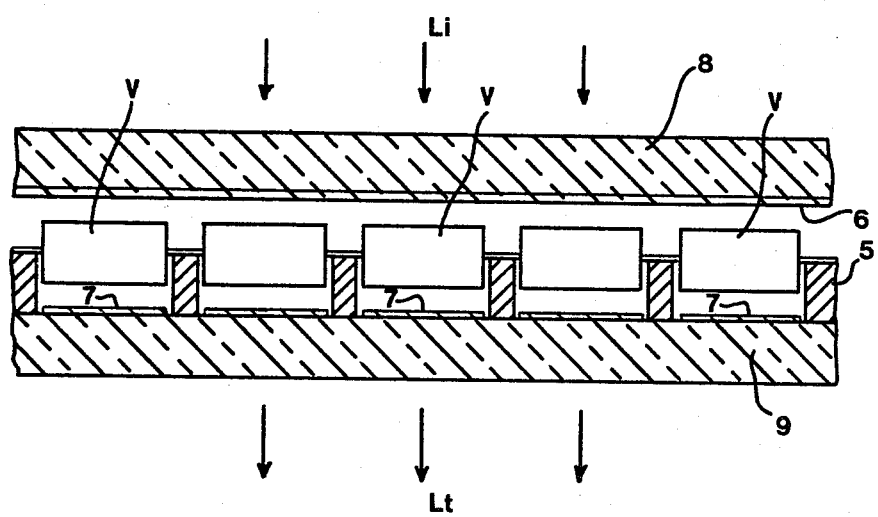
FIG.4

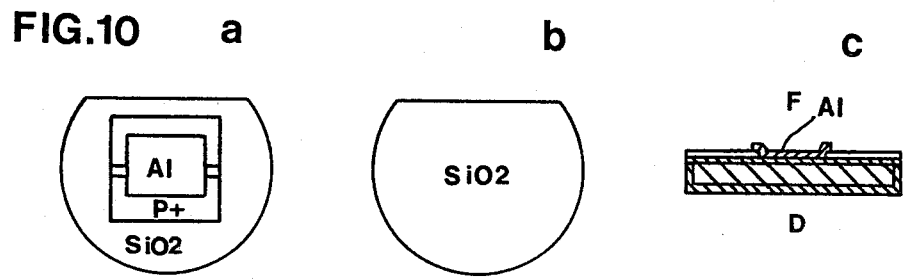
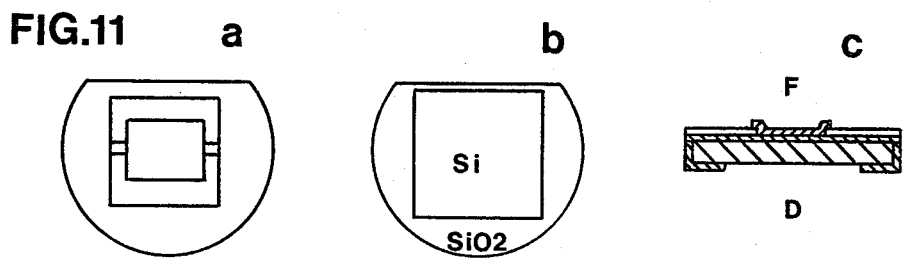
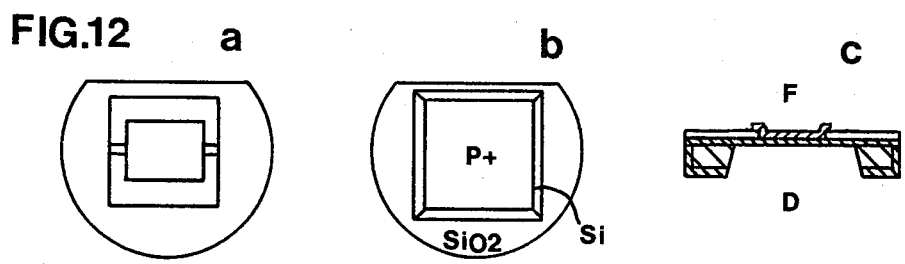
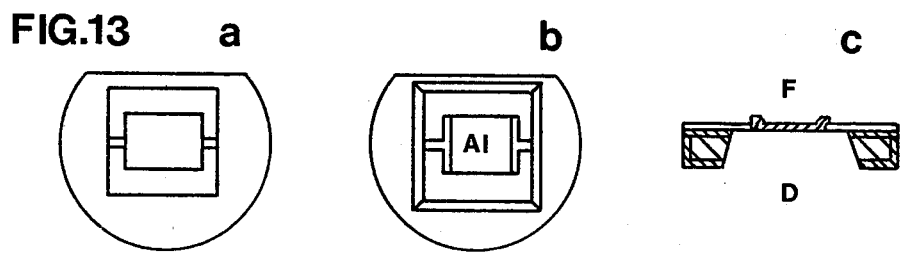

MINIATURE DISPLAY DEVICE

BACKGROUND OF THE INVENTION

The present invention relates to a miniature display device which is electrostatically operated and which makes it possible to produce display cells which can be used in particular in battery-powered portable equipment such as electronic calculators and watches. The invention also concerns a process for producing the miniature display device.

Considerable efforts have been made to discover and develop display systems which are aesthetically pleasing, which operate with a low supply voltage, which have a very low level of power consumption and which can be produced inexpensively. Liquid crystal display devices fulfilled these conditions until the power consumption of electronic circuits, in particular CMOS-type integrated circuits, fell to such a point that the contribution of the display device to overall power consumption ceased to be negligible. Moreover, actuation of such devices is complex and the contrast and aesthetics thereof are not always among the best.

Among display devices which have a low level of power consumption, mention may be made of that which is known by the name "The Distec System" and described in the document "An Electrostatic Sign—The Distec System", W. R. Aiken, Display Technology Corp., Cupertino, Calif., U.S.A. This device is used as an advertising panel or sign of large dimensions. It comprises modules formed by shutter members which are suspended at one axis by hinge members and which are capable of rotating under the effect of an electrical field applied by a system of electrodes. The control voltage is approximately 3000 volts. However, it has never been suggested that this system might be adapted to provide a miniature display with a low control voltage.

Light modulating devices are also know, which use diaphragms which are deformable under the influence of an electrical field or an electron beam and which can be produced by means of methods derived from the production of integrated circuits. Such modulating devices are described for example in U.S. Pat. Nos. 3,600,798 and 3,886,310. The first patent discloses a device which makes it possible to modulate the amount of light transmitted by deformation of a diaphragm or membrane under the influence of an electrical field, while the second patent describes a device which makes it possible to modify the angle of reflection of the light, by deformation of a diaphragm under the effect of an electron beam. However, neither of these devices is a display device, the amplitude of the movement of the diaphragm in both cases being very small and the provision of an additional light source being necessary.

SUMMARY OF THE INVENTION

An object of the present invention is to provide a miniature display device which has a very low level of power consumption, which presents excellent contrast, which operates with a low supply voltage and which can be produced with the technology involved in electronic integrated circuits.

According to the present invention there is provided a miniature display device comprising a plurality of shutter members having rest positions in which they obturate one or more cavities in a carrier and each being suspended from the carrier by two resilient attachments at opposite edges respectively of the shutter member, the attachments allowing the shutter member to turn about a torsion axis but acting torsionally to bias the shutter member back to its rest position, and means for subjecting each shutter member to an electric field such as to cause the member to turn through a substantial angle about its torsion axis, thereby to minimize or cease its obturating action.

Control of the shutter members is simplified insofar as they are returned to their rest position by their resilient attachments which form a return spring means. In addition, the principle of the device gives it the advantage of having a very high level of contrast, operating with a low control voltage which may be continuous or alternating and which is compatible with the voltages encountered in portable battery-powered equipment, having a very low level of power consumption, being of pleasing aesthetic appearance, permitting a wide choice of different colors and materials for the shutter members, and having excellent long-term stability in respect of the components.

BRIEF DESCRIPTION OF THE INVENTION

The invention will now be described by way of example with reference to the accompanying drawings in which:

FIG. 1 is a diagrammatic view illustrating the principle of a device embodying the invention, FIG. 2a is a sectional view of a display using the device of FIG. 1, FIG. 2b shows an alternative form of the embodiment shown in FIG. 2a, FIGS. 3a and 3b show different possible shapes for shutter member attachments used in the invention, FIG. 4 shows the principle of an optical valve utilizing a device embodying the invention, FIGS. 5 to 13 show the states of a base plate in the course of the different production steps: each Figure shows at (a) a front view, at (b) a back view and at (c) a sectional view seen from the side of the plate, FIG. 14 shows an embodiment of a seven-segment one-digit display cell, FIG. 15 shows a detail on an enlarged scale of FIG. 14, FIG. 16 shows the designation of the segments of the seven-segment display shown in FIG. 14, and FIG. 17 is the block circuit diagram of the control means of the cell of FIG. 14.

DETAILED DESCRIPTION OF THE INVENTION

Figure 1:
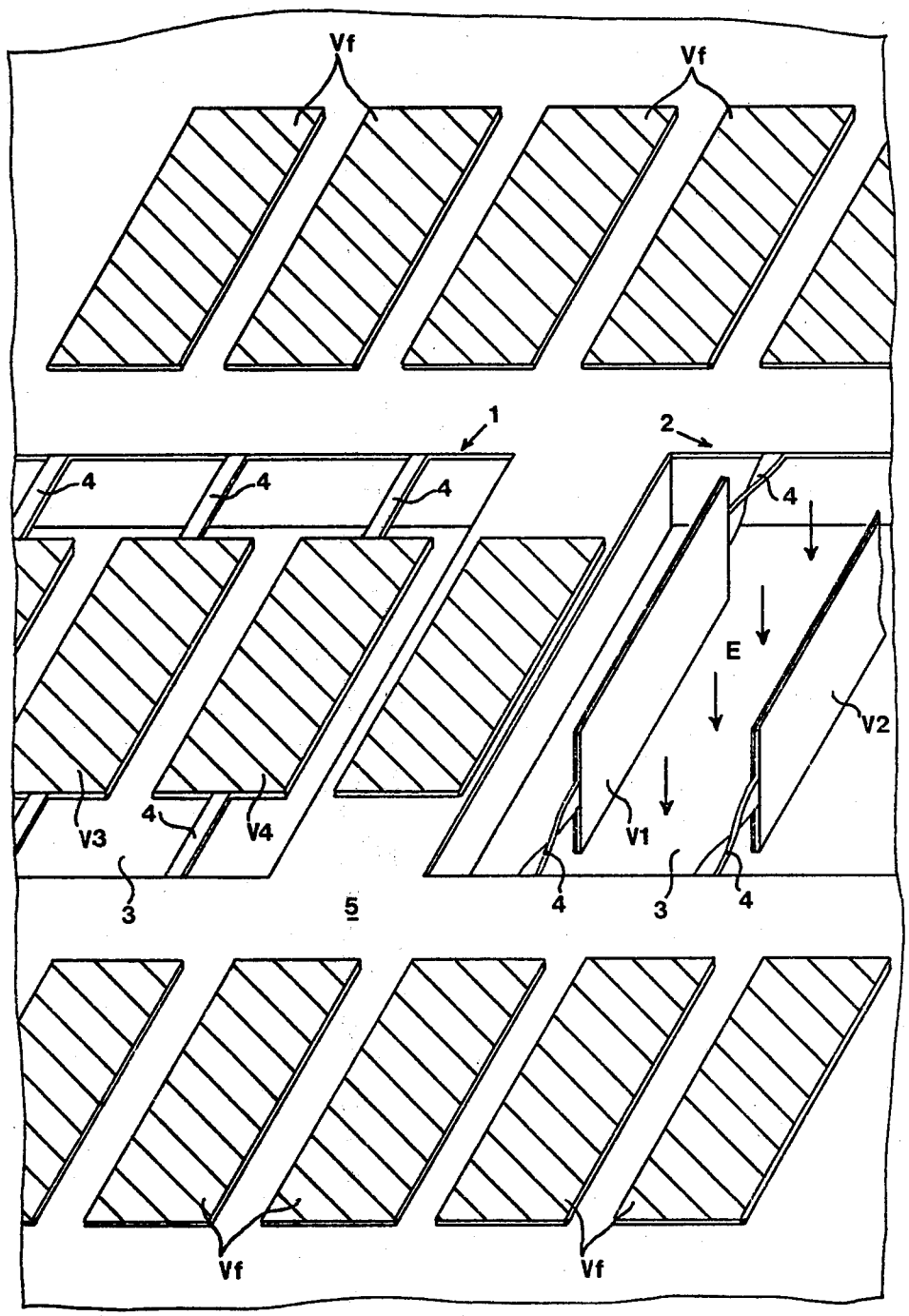

FIG. 1 shows a diagrammatic view of part of a display device embodying the invention. An insulating carrier 5 is provided with cavities 3 of rectangular shape. Shutter members V1 to V4 are disposed above the cavities and are held to the carrier 5 by resilient attachment means 4. In the rest condition, illustrated at 1, the shutter members V3 and V4 are parallel to the plane of the carrier and obturate the corresponding cavity. On the other hand, if an electrical field E which is substantially perpendicular to the plane of the carrier is applied, the shutter members take up an orientation which is substantially parallel to the applied field, thus opening the corresponding cavity. This is illustrated at 2 for shutter members V1 and V2. It will be appreciated that the orientation of the shutter members depends on the strength of the electrical field E and the return torque applied by the attachments 4 when the shutter members have moved out of their rest position.

FIG. 1 also shows rectangles Vf of the same shape and appearance as the shutter members V1 to V4, which are disposed on the carrier 5 so as to be in a regular arrangement with said shutter members. The advantage of this arrangement is to give a regular appearance, even if only some regions of the total visible surface have to be capable of activation.

The carrier 5 is made of a semiconductor material such as silicon or germanium and the shutter members comprise at least one layer of semiconductor material and/or metal. The attachments are made of metal, which may be an alloy, semiconductor or an oxide. It will be appreciated that the different components listed above are by way of example and other components could also be used, as will be seen hereinafter. However, for the embodiment under consideration it is important that the following conditions are fulfilled, namely: the carrier must be insulating; the shutter members must comprise at least a material having a dielectric constant which is different from that of the medium in which they are disposed, and the attachments must have an appreciable degree of resiliency.

Figure 2:
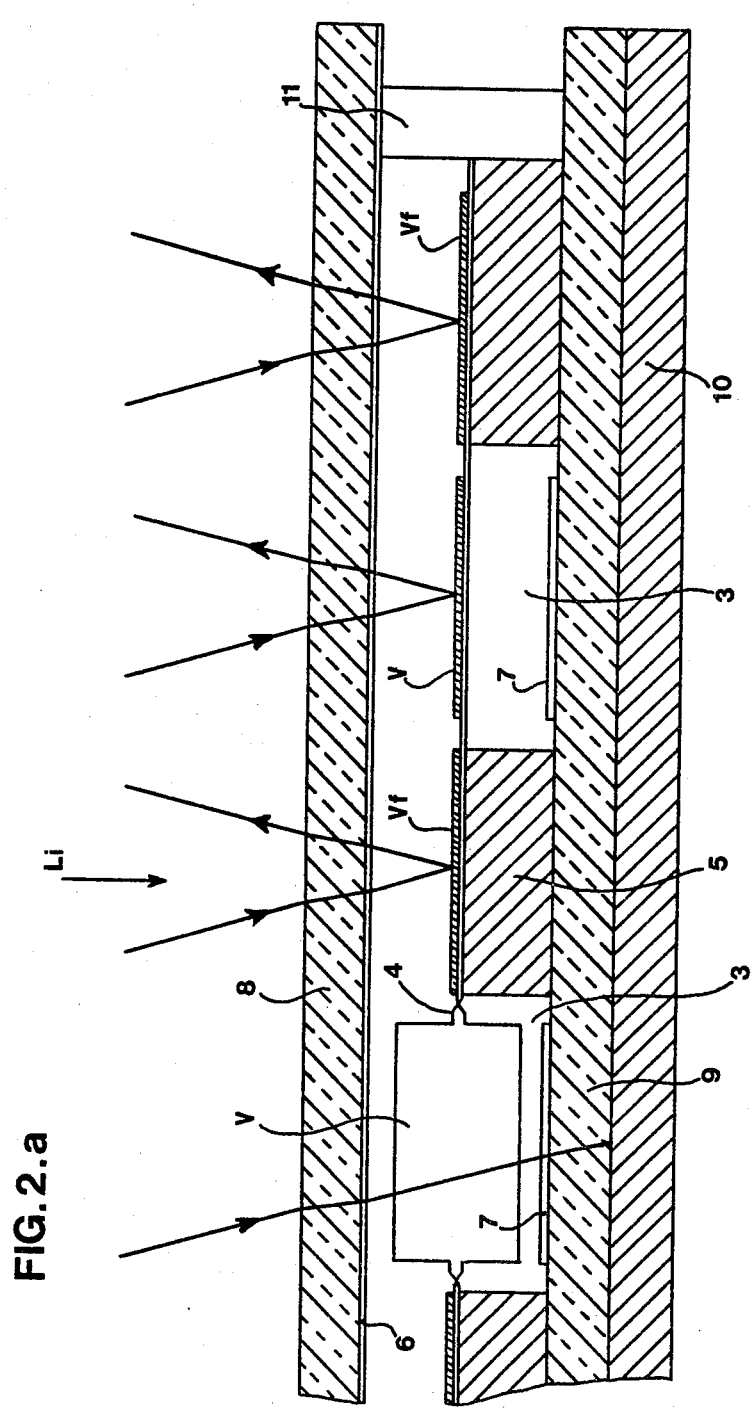

FIG. 2a is a sectional view of part of a display device utilizing the principles of the present invention and provided with means for controlling the shutter members. FIG. 2a again shows the carrier 5 with its cavities 3, the rectangles Vf and the shutter members V with their resilient attachments 4. The carrier 5 is fixed on a transparent plate 9 which, on its upper face, carries transparent electrodes 7 which are disposed facing the shutter members V while, on its lower face, the plate 9 has a layer 10 of material for absorbing light. A second transparent plate 8 is disposed above the shutter members and held at a suitable spacing by spacer members 11. On its lower face, the plate 8 has an electrode 6 which is also transparent and which is common to all the shutter members V. By way of example, the transparent plates 8 and 9 are of glass and the transparent electrodes comprise films of tin and indium oxide.

From the electrical point of view, the mode of operation of the device is as follows: in the absence of an electrical field between the electrodes 6 and 7, the attachments hold the shutter members parallel to the plane of the carrier 5. When a direct or alternating voltage is applied between the common electrode 6 and the electrode 7 corresponding to a given shutter member, the electrical field created between the electrodes induces dipoles in the shutter member in question, thereby producing a resultant torque which causes the shutter member to turn about the axis through its resilient attachments. The shutter member turns until the return torque due to the resilient attachments balances the electrically induced torque. The shutter members therefore rotate through 90 at the maximum since the elecrical torque disappears at that angle. In the rest position, the shutter members V close off the cavities and then, like the rectangles Vf, reflect almost all of the incident light Li. On the other hand, in the activated state, the shutter members V open the cavities and permit the incident light to be absorbed by the layer 10. It is apparent that the layer 10 instead of being absorbing could be reflecting and the shutter members V and the rectangles Vf be covered with a layer of absorbing material.

Another advantageous embodiment is shown in FIG. 2b in which elements which are similar to those in FIG. 2a are denoted by the same references. In this alternative form, each shutter member V itself forms one of the two electrodes required to produce an electrical field; the other electrode 7 for example can be deposited on the transparent plate 9, as in the construction shown in FIG. 2a. In this case, each shutter member V will advantageously be fixed to the carrier 5 by resilient attachments which are aligned with one of the sides of the shutter member. In this manner, the shutter members V can be completely retracted within the cavities 3 and the overall thickness of the device will be reduced. The shutter members can be connected together and thus form the common electrode. They can also be capable of being individually addressed and then the electrodes 7 are connected together to form the common electrode. It would also be possible, if required by the application, to have both electrodes for each shutter member individual thereto.

The dimensions of the resilient attachments depend on the maximum torque generated by the electrical field, it being known that the torque is at a maximum when the shutter member is approximately at 45° and that it is approximately equal to the electrical energy per radian accmulated in the volume swept by a complete revolution of the shutter member. Thus, for a shutter member which is 100 μm in width, which is disposed in air and placed in a field of $10^5$ V/m, the maximum torque is about $4.10^{-10}$ Nm per unit of length of the shutter member. The torque applied decreases by half when the shutter member is at an angle of 75°. The return torque of the resilient attachments must be less than the maximum torque produced by the electrical field so as to permit sufficient rotary movement to the shutter member. Good results are obtained when the shutter members and the attachments are produced by engraving a layer of aluminium which is from 50 to 200 nanometers in thickness or when the resilient attachments are made of silicon oxide ($SiO_2$). Silicon oxide further improves the resiliency required and shock resistance.

The power consumption of the device is approximately twice the energy electrostatically accumulated in a display cell which is without its shutter member, that is to say, it is less than 1 $nJ/cm^2$ per cycle for a cell which is 100 μm in thickness, operating at a voltage of 10 volts in air (10 $nJ/cm^2$ per cycle for a thickness of 10 μm). This level of consumption is several orders of magnitude lower than that of display cells which are currently referred to as low-consumption cells. This very low level of consumption of the display with a gaseous dielectric (air) or under vacuum makes it possible without difficulty and without serious losses to use integrated voltage multipliers in order to produce the control voltage required from low-capacity batteries.

Using a liquid dielectric makes it possible to multiply the induced electrical torque by $\epsilon_r$=relative dielectric constant. For a given system, that makes it possible to reduce the voltage required at the electrodes, by a factor which is approximately equal to $2\sqrt{\epsilon_r}$ because, as will be explained below, a rotary movement of 45° at the maximum is sufficient in this case for good optical operation, by virtue of the light being trapped in the cell. If a liquid dielectric is used which has neither ionic conduction nor electronic conduction, the system makes it possible to reduce further the power consumption. However, while the response time of the shutter members is very short in air (of the order of 100 μs), it is much longer in a liquid dielectric.

There are various possibilities for the shutter members, the attachments and the carrier, within the scope of the invention, and several may be mentioned as follows:

The shutter members may:
(a) comprise a layer at least of a material which is markedly more polarizable than the dielectric surrounding them; thus, it is possible to use metals, doped or undoped semiconductors, piezoelectric materials, etc;
(b) be of shapes other than rectangular;
(c) be surrounded by a gaseous or liquid dielectric which is as insulating as possible, which has a low dielectric constant and low viscosity (for example, noble, non-reactive, rarified gases, or liquids such as fluid oils);
(d) be fixed to the resilient attachments away from their axis of symmetry (FIG. 2b); and
(e) not be all in the same plane.

Figure 3:
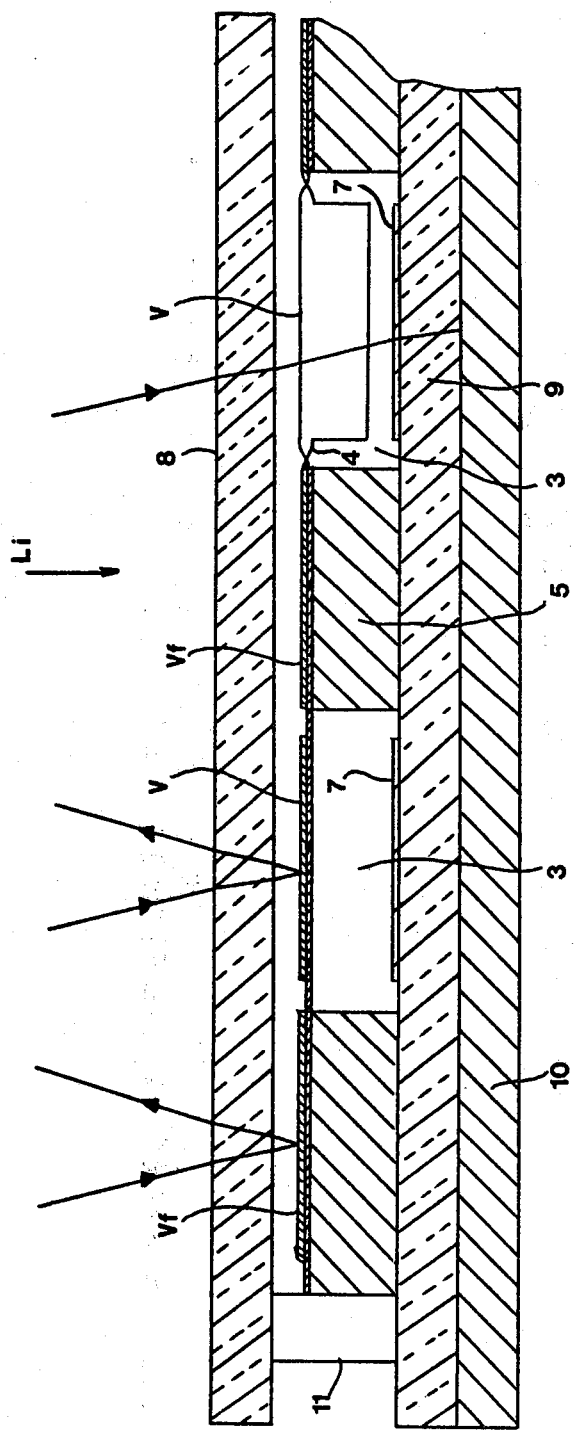

The resilient attachments may:
(a) comprise various material such as, for example: metal and alloys of silver, aluminium, gold, chromium, copper, iron, etc; semiconductors such as silicon, germanium, etc; oxides of silicon ($SiO_2$), aluminium ($Al_2O_3$), titanium ($TiO_2$), zirconium ($ZrO_2$), etc; polycrystalline materials; plastic materials; derivatives of latex;
(b) be of various shapes in order to have the required resiliency; cranked attachments 12 and 13 having S or U shapes are shown in FIGS. 3a and 3b, respectively, while FIG. 13b shows T-shaped attachments.

The carrier may:
(a) be of a material different from silicon;
(b) be completely or partially covered by one or more layers of materials;
(c) have cavities which extend wholly or partially through the thickness of the carrier.

FIG. 4 shows an alternative form of the device of FIG. 2a, wherein the absorbing material has been omitted. As the two plates 8 and 9, and also the electrodes 6 and 7, are transparent, the device can be used as an optical valve.

The mode of operation of the devices shown in FIGS. 2a, 2b and 4 is as follows: In the absence of an electrical field, all the shutter members are in the rest position and present their large surface to the incident light Li. When a sufficient voltage is applied to the electrodes 6 and 7 associated with a shutter member (FIGS. 2a and 4) or between the shutter member V and the corresponding electrode 7 (FIG. 2b), that shutter member rotates about its attachments and then presents only a reduced surface area (equal to the edge of the shutter member in the best case) to the incident light. Hence it will be seen that it is possible to provide a display device in which the shutter members or groups of shutter members form the active elements. A high level of contrast and a good aesthetic effect can be obtained with the construction shown in FIGS. 2a and 2b, by using the metallized reflecting and/or diffusing shutter members, and an absorbent material of a dark or bright color. In the case of the device shown in FIG. 4, the presence or the absence of a voltage between the electrodes associated with a shutter member permits or prevents transmission of the incident light through the device. The device shown in FIG. 4 therefore forms an assembly of electrically addressable optical valves. When a dielectric other than air or vacuum is used in the display devices of FIGS. 2a and 2b, the electrical control field does not necessarily have to align the shutter members vertically in order to produce a fully contrasted display. Indeed, the shutter members only have to be at an angle $\beta$ with respect to their rest position such that:

$$\beta \geq \text{arc sin}(1/n)$$

in which n is the refractive index of the dielectric, in order for the incident light reflected by the shutters to be "trapped" in the cell. In practice, the dielectric used will be a liquid having a refractive index of around $n=1.5$, thus giving an angle $\beta \geq 41.8°$.

Visually, this phenomenon is equivalent to absorption of the light, so that the cavities which are partially revealed by the shutter members appear for example in a darkened mode (the color of the bottom of the cavities) on a metallized background (color of the shutter members).

Other possibilities so far as the optical arrangements are concerned are as follows:
the shutter members may be made in such a way as not only to present the appearance of a metallized reflecting and/or diffusing deposit, but they can also be colored by the deposition of fine interference layers ($SiO_2$, $TiO_2$, $Al_2O_3$, etc.) or absorbing layers (amorphous deposits of semiconductors and other materials),
colored pigments may be incorporated in the liquid dielectric, and
the absorber means 10 may absorb all or part of the visible spectrum, and may be formed either by a separate plate or by a layer which is deposited on one of the faces of the lower glass plate 9 carrying the transparent electrodes 7, or by a deposit at the bottom of the cavities.

The different stages in the process of producing the device will now be described by way of example.

The base material is a silicon plate having the following characteristics:
Diameter: about 5 cm (2 inches)
Thickness: about 280 $\mu$m
Orientation: (100)

The process is described with reference to FIGS. 5 to 13. In each case, three views, designated as (a), (b) and (c), show respectively a front view of the plate, a back view and a side view in section. Although only a single shutter member has been shown for the purposes of simplification of the drawing, it will be appreciated that in actual fact the process makes it possible to produce simultaneously a plurality of shutter members on the same silicon plate.

Figure 5:
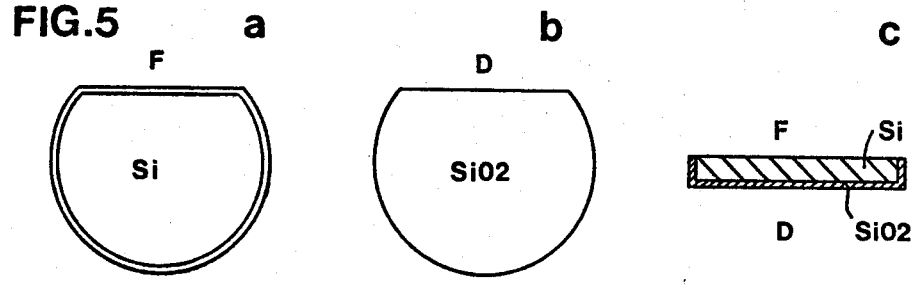

Step 1: Growth of a layer of silicon oxide which is 2 $\mu$m in thickness on the back of the plate (FIG. 5)

The plate is placed in a high-temperature oxidation furnace. An oxide is formed over the entire surface of the plate. This thickness of the oxide formed depends on the temperature, the nature of the gases and the reaction time.

The back of the plate is covered with a photoresist layer such as that produced by the Hunt company under the name "Waycoat", which protects it during the following operation. The plate is placed in a solution of buffered hydrofluoric acid, which attacks the exposed oxide. The photoresist layer is then removed.

Figure 6:
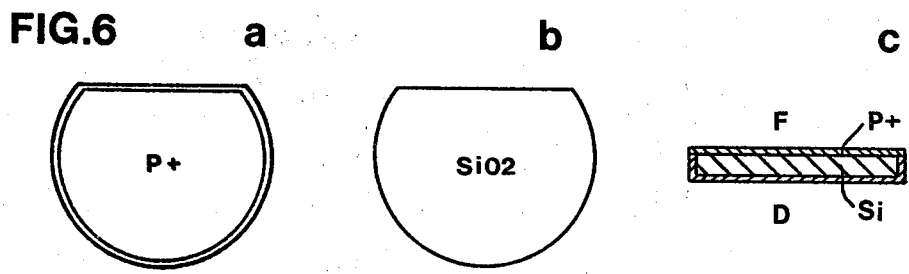

Step 2: Produce a layer of type P+ on the face of the plate (FIG. 6)

A layer of "Vapox-boron", that is to say, silicon oxide, which is doped with boron, and which is deposited by a chemical vapor deposition process, is deposited on the face of the plate in a reaction vessel. Diffusion is then effected at high temperature in a nitrogen atmosphere for a short period of time to cause the boron to diffuse into the silicon. The back of the plate is then protected with photoresist and the remains of the Vapox-boron layer are etched away by the solution of buffered hydrofluoric acid. The photoresist layer is then removed.

Figure 7:
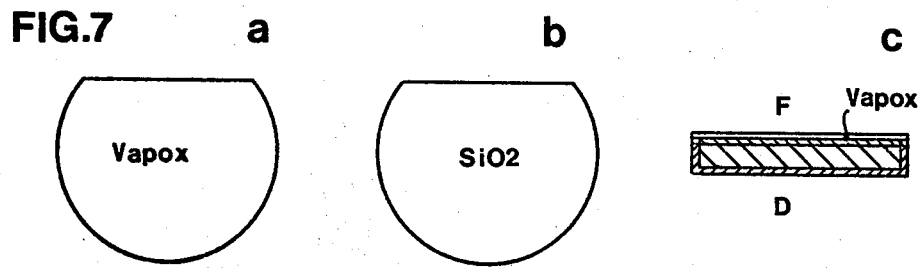

Step 3: Deposit of a layer of Vapox on the face of the plate (FIG. 7)

This layer is intended to form the resilient attachments and is 800 Å in thickness. The plate is placed in a reaction vessel and a layer of Vapox is deposited on the face of the plate.

Figure 8:
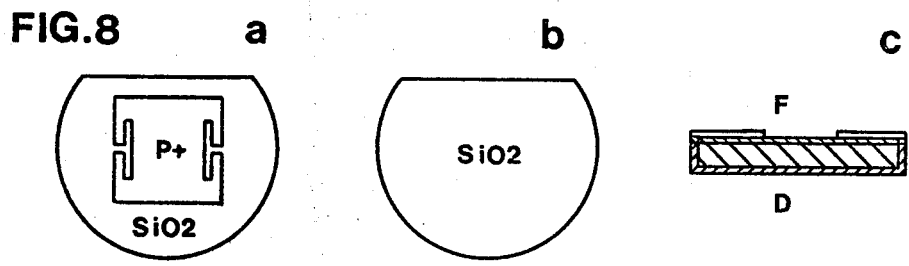

Step 4: Cutting out the attachments (FIG. 8)

The face of the plate is covered with a layer of photoresist which is exposed with a suitable mask and developed. The attachments are then cut out by selective etching by means of the above-mentioned solution of buffered hydrofluoric acid. The photoresist is then removed.

Figure 9:
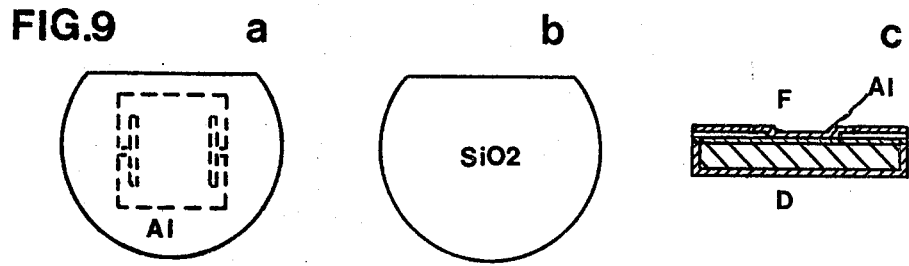

Step 5: Metallization of the face of the plate (FIG. 9)

A layer of aluminium is deposited for forming the shutter members and is 2000 Å in thickness. The plate is placed in an evaporator and the layer of aluminium is deposited on the face of the plate.

Step 6: Cutting out the shutter members (FIG. 10)

The face of the plate is covered with a layer of photoresist, which is exposed with a suitable mask and developed. The shutter members are cut out by means of a solution which attacks the aluminium. The photoresist is then removed.

Step 7: Cutting out the layer of silicon oxide on the back (FIG. 11)

The face of the plate is protected with a negative photoresist layer. The back is covered with a positive photoresist layer which is exposed with a suitable mask and developed. The silicon oxide is cut away by a solution of buffered hydrofluoric acid. The two layers of photoresist are then removed. This operation serves to form a silicon oxide mask on the back, for the following operation.

Step 8: Producing the cavities in the plate (FIG. 12)

The face of the plate is protected by a suitable arrangement and the back of the plate is etched by a known solution for attacking silicon. Cavities are produced in the plate. The attack is stopped at the P+-type layer.

Step 9: Freeing the shutter members (FIG. 13)

The plate is placed in a plasma-type reactor with a carrier which protects the face of the plate. The P+-type layer is attacked and removed. The attachments and the shutter members are thus released. The face of the plate will advantageously be a mat face in order that the visible face of the shutter members shall be as highly diffusing as possible.

The plate which in actual fact comprises a plurality of shutter members may be cut up into a certain number of units, each of which is placed in a chamber whose walls 8 and 9 are transparent, carry electrodes 7 (see FIGS. 2a, 2b and 4) and possibly 6 (see FIGS. 2a and 4), and are separated from each other by spacer members 11. In addition, in the foregoing process, it will be apparent that the number of shutter members per cavity and likewise the number of cavities per plate may be greater than 1, the shutter members preferably being arranged in the form of a matrix.

Figure 14:
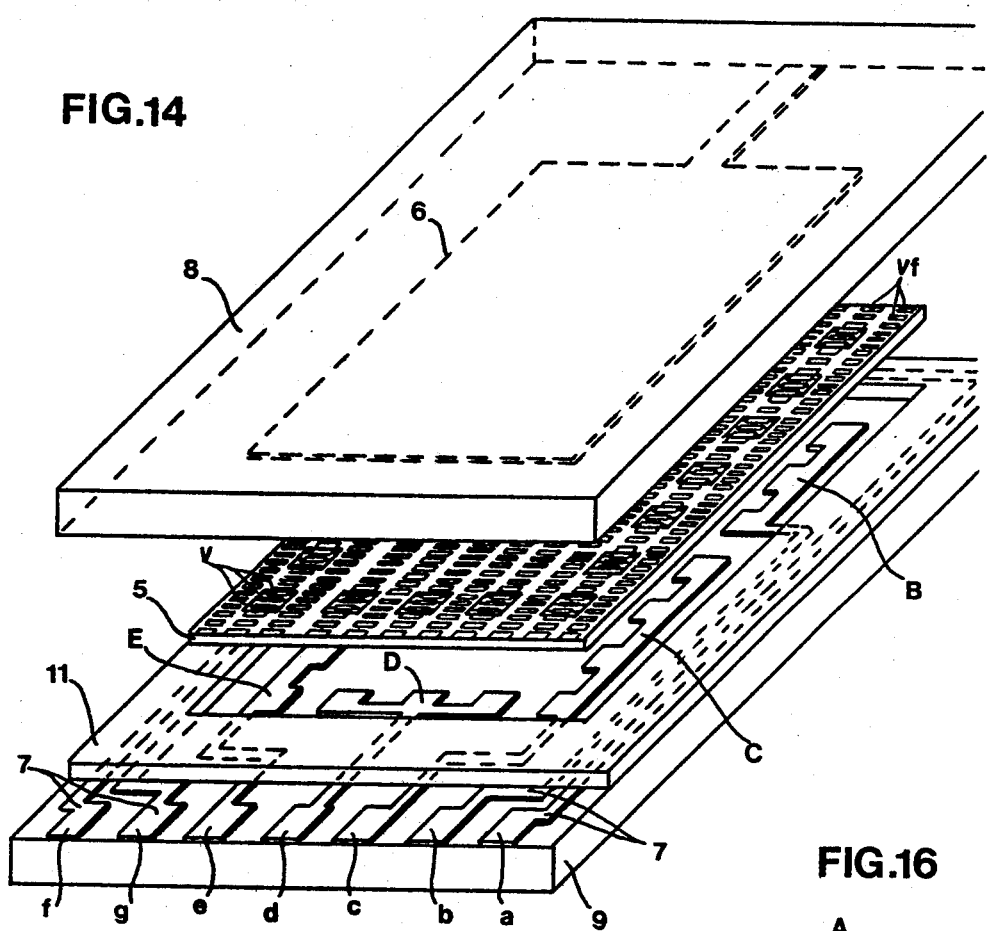
Figure 15:
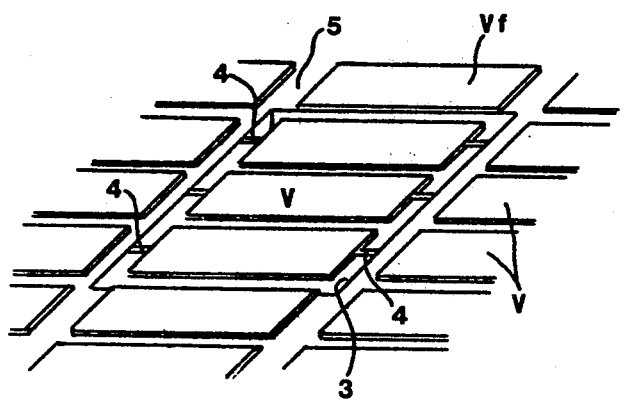
Figure 16:
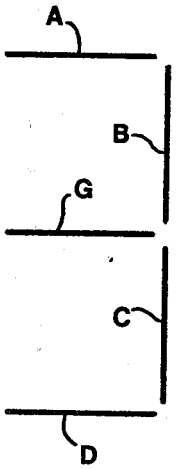

FIG. 14 shows by way of example the arrangement of a display cell for one seven-segment digit using the above-described display device. The same components as those described in FIG. 2a are also to be found in FIG. 14, being denoted by the same reference numerals, except for the absorbing means which has been omitted in order to show that such a display device can also be used in a light transmission mode. Referring to FIG. 14, shown therein are the transparent glass plate 8, the common electrode 6, the carrier 5 for the shutter members and the cavities permitting the shutter members to turn about their attachments, the spacer member 11 which can be a simple plastic frame, the function thereof being merely to fix the distance between the electrodes when air is used as a dielectric around the shutter members, and the lower glass plate 9 which carries the transparent shutter member-addressing electrodes 7. These electrodes which are respectively designated by letters a to g correspond respectively to the segments A to G of the digit, as shown in FIG. 16. In the structure shown in FIG. 14, the segment D is formed by three elements, each formed by three shutter members V, as shown in the detail view on an enlarged scale in FIG. 15. The same also applies in regard to the segments A, B, F and G whereas the segments C and E are formed by four elements, each of three shutter members.

The provision of a seven-segment display in the form of a simplified matrix of shutter members, like that shown in FIG. 14, shows that the proposed principle may be used to produce a more complex matrix of optical valves or display elements.

The electrodes which are deposited on the glass plates 8 and 9 are produced using known liquid crystal display methods, such as for example: depositing a layer of tin and indium oxide by a chemical vapor deposition process or by sputtering engraving and then optional insulation by depositing an oxide (for example $SiO_2$) or a nitride (for example $Si_3N_4$), to form electrodes which are referred to as "blocking" electrodes.

The carrier 5 may be made integral with one of the glass plates carrying the electrodes and it may be produced, inter alia, by evaporation or by chemical vapor deposition of, for example, polycrystalline Si.

When a liquid dielectric is used around the shutter members, it is possible to use methods which have been developed for the encapsulation of liquid crystal-type cells.

Figure 17:
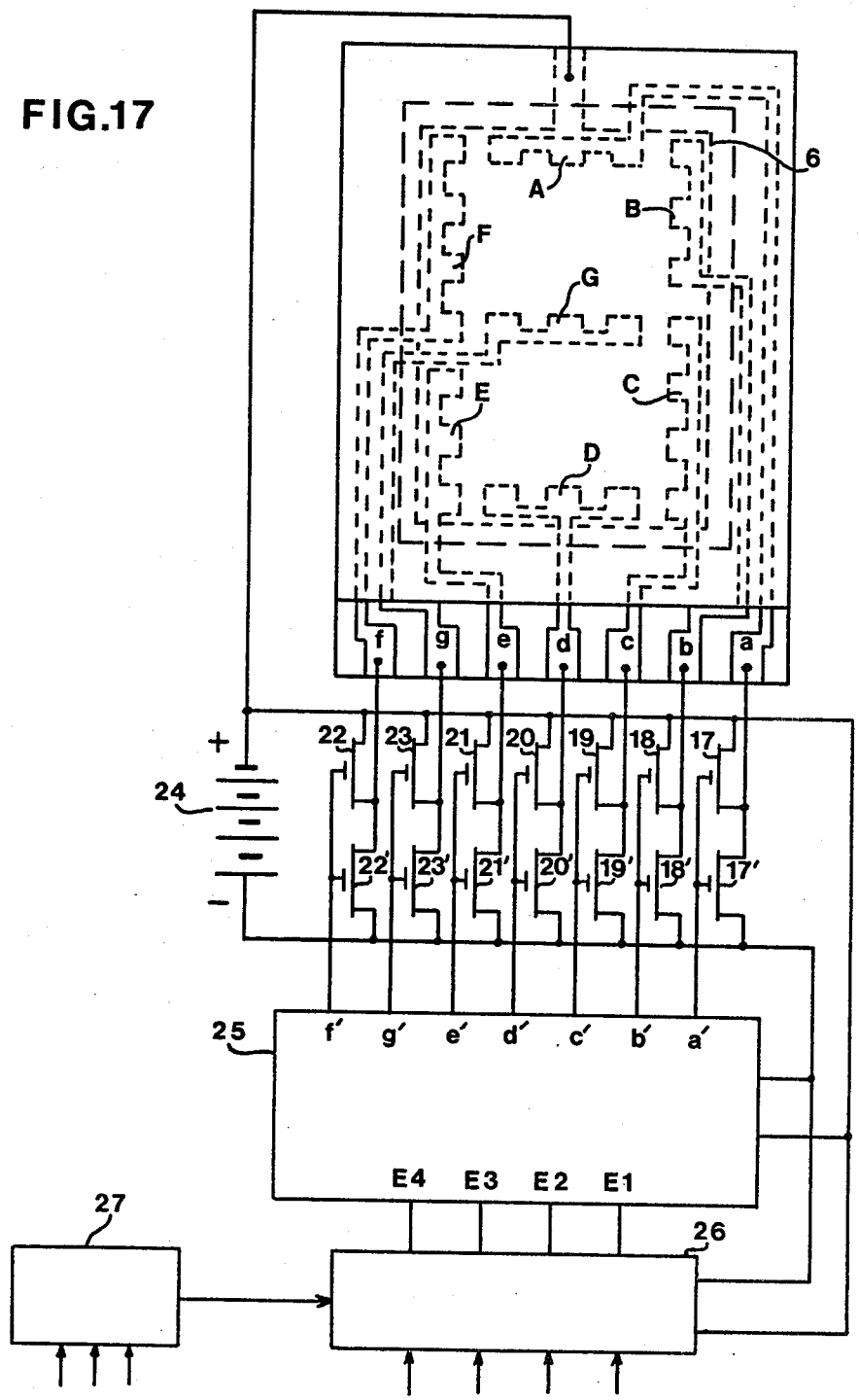

FIG. 17 shows the block circuit diagram of the means for controlling the display cell having seven segments A-G of FIG. 14. In FIG. 17, the display cell is illustrated without the shutter member carrier, in order to show the shape and the overlap configuration of the electrodes.

Each element of the display assembly forms a capacitor which is variable in accordance with the position of the shutter members, and each resulting capacitance varies with the control voltage applied between the common electrode 6 and the shutter member-addressing electrodes a–g. The capacitance approximately doubles between the operative or activated position (shutter members in a plane perpendicular to the plane of the carrier) and the rest position (shutter members in the plane of the carrier). As the system is capacitive, it has a memory, the useful memorization period of which depends on the leakage currents of the electronic control arrangement. This particular feature can be put to use in certain practical applications such as displaying images on a screen. FIG. 17 shows that the segments are controlled by inverters 17-17' to 23-23' formed by complementary MOS transistors. In the embodiment described, the transistors 17 to 23 are of p type and the transistors 17' to 23' are of n type.

In each pair, the source S of the p type transistor is connected to the positive terminal of a supply source 24 and the drain D of the p transistor is connected to the drain of the n type transistor whose source S is connected to the negative terminal of the power source 24. The drains of each pair are connected to the corresponding addressing electrode: the drains of pair 17-17' to electrode a, the drains of pair 18-18' to the electrode b, and so on, down to the drains of pair 23-23' which are connected to electrode g. The gates G of the n and p type transistors of each pair are connected together and to one of the outputs a'–g' of a decoder 25 of known type, whose inputs E1–E4 are respectively connected to the outputs of a buffer register 26 which receives the binary coded decimal information corresponding to the segments to be activated. The buffer register 26 is controlled by an address decoder 27 which receives the address of the digit to be displayed, from a circuit not shown. The address decoder 27 then passes to the buffer register 26 an activation signal which permits it to register the binary coded decimal information which is applied to its inputs. The inverters 17-17' to 23-23' determine the control voltage between the common electrode 6 and the segment addressing electrodes a–g. For the outputs of the decoder 25, which are at the logic level corresponding to the positive potential of the source 24, the n-channel MOS transistors of the corresponding inverters are conducting and the p-channel transistors are non-conducting. The negative potential of the source of the n-channel transistors is then transmitted to the corresponding addressing electrodes, while the common electrode 6 is still connected to the positive potential of source 24. This condition produces a rotary movement of the shutter members and consequently a display in respect of the segments in question. For the outputs of the decoder 25, which are at the logic level corresponding to negative potential of the source 24, it is the p-channel MOS transistors of the corresponding inverters which are conducting, while the n-channel transistors are non-conducting. This condition corresponds to a very low residual voltage between the electrodes, for addressing the segments in question, and the common electrode 6. This residual voltage is insufficient to cause the shutter members to rotate so that the segments in question are not displayed.

Although exemplary embodiments of the invention have been shown and described, it should be understood that many modifications can be made without departing from the spirit and scope of the invention. Accordingly, the invention is not limited by the foregoing description but only by the claims appended hereto.

What is claimed is:

1. A miniature display device comprising a plurality of shutter members having rest positions in which they obturate one or more cavities in a carrier and each being suspended from the carrier by two resilient attachments at opposite edges respectively of the shutter member, the attachments allowing the shutter member to turn about a torsion axis but acting torsionally to bias the shutter member back to its rest position, and means for subjecting each shutter member to an electric field to cause the member to turn through a substantial angle about its torsion axis, thereby to decrease its obturating action.

2. A miniature display device according to claim 1, wherein the thickness of the resilient attachments is less than ten microns.

3. A display device according to claim 1 or 2, wherein the carrier is within a closed enclosure having first and second walls which are substantially parallel to the plane of the carrier, the first wall being transparent.

4. A display device according to claim 3, wherein the carrier is fixed with respect to the second wall.

5. A display device according to claim 3, wherein the second wall is also transparent.

6. A display device according to claim 4, wherein the second wall is also transparent.

7. A display device according to claim 3, wherein the second wall is covered with a material absorbing all or part of the light reaching it.

8. A display device according to claim 4, wherein the second wall is covered with a material absorbing all or part of the light reaching it.

9. A display device according to claim 3, wherein said electric field subjecting means comprise a pair of electrodes per shutter member or group of shutter members, disposed on respective sides of the shutter member of group of shutter members, and wherein one electrode of the pair is transparent and is disposed on the transparent wall.

10. A display device according to claim 3, wherein said electric field subjecting means comprise one electrode per shutter member or group of shutter members, which is disposed facing the shutter member or group of shutter members, the electrical field being applied between the shutter member or group of shutter members and the electrode.

11. A display device according to claim 7, wherein an electrode is common to a plurality of shutter members or groups of shutter members.

12. A display device according to claim 8, wherein an electrode is common to a plurality of shutter members or groups of shutter members.

13. A display device according to claim 1, wherein the said angle is substantially 90°.

14. A display device according to claim 1, wherein the shutters are immersed in an electrically insulating liquid.

15. A display device according to claim 14, wherein said angle is equal to or larger than arc sin (1/n), where n is the refractive index of the liquid.

16. A display device according to claim 11, wherein the insulating liquid is tinted with a colored pigment.

17. A display device according to claim 12 wherein the insulating liquid is tinted with a colored pigment.

18. A display device according to claim 1, wherein the carrier is made of silicon.

19. A display device according to claim 1, wherein the resilient attachments are made of silicon oxide.

20. A display device according to claim 1, wherein the shutter members comprise a layer of silicon oxide and a layer of metal.

21. A display device according to claim 1, wherein the shutter members and resilient attachments are made of aluminium.

22. A display device according to claim 1, wherein the resilient attachments are U-shaped.

23. A display device according to claim 1, wherein the resilient attachments are S-shaped.

24. A display device according to claim 1, wherein the resilient attachments are straight.

25. A display device according to claim 1, wherein the resilient attachments are T-shaped.

26. A display device according to claim 1, wherein said shutter members are arranged in said display device together with fixed areas on said carrier, said fixed areas having the same shape and light reflective properties as said shutter members.

* * * * *